United States Patent
Drubel et al.

(10) Patent No.: US 7,211,989 B2
(45) Date of Patent: May 1, 2007

(54) METHOD FOR ACCELERATION OF A SHAFT RUN, AS WELL AS AN APPARATUS FOR CARRYING OUT THE METHOD

(75) Inventors: Oliver Drubel, Nussbaumen (CH); Reinhard Joho, Rombach (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/105,981

(22) Filed: Apr. 14, 2005

(65) Prior Publication Data

US 2005/0200336 A1    Sep. 15, 2005

Related U.S. Application Data

(63) Continuation of application No. PCT/EP03/50713, filed on Oct. 13, 2003.

(30) Foreign Application Priority Data

Oct. 14, 2002  (DE) ................. 102 47 905

(51) Int. Cl.
| | |
|---|---|
| H02P 9/30 | (2006.01) |
| H02P 9/42 | (2006.01) |
| H02P 11/00 | (2006.01) |
| H02K 7/10 | (2006.01) |
| H02H 7/06 | (2006.01) |

(52) U.S. Cl. .......................... 322/29; 322/32
(58) Field of Classification Search ........... 322/29, 322/32, 59
See application file for complete search history.

(56) References Cited

U.S. PATENT DOCUMENTS

| | | | |
|---|---|---|---|
| 3,483,463 A | * 12/1969 | Smith | 322/29 |
| 3,809,914 A |   5/1974 | Kilgore et al. | 290/38 |
| 4,400,659 A | * 8/1983 | Barron et al. | 322/32 |
| 4,625,160 A | * 11/1986 | Hucker | 322/32 |
| 4,743,777 A | * 5/1988 | Shilling et al. | 290/46 |
| 4,806,841 A | * 2/1989 | Lee et al. | 322/29 |
| 5,028,804 A | * 7/1991 | Lauw | 290/40 C |
| 5,097,195 A |   3/1992 | Raad et al. | 322/10 |
| 5,418,446 A | * 5/1995 | Hallidy | 322/28 |
| 5,587,647 A |   12/1996 | Bansal et al. | 322/45 |
| 5,747,971 A |   5/1998 | Rozman et al. | 322/10 |
| 6,936,947 B1 | * 8/2005 | Leijon et al. | 310/196 |
| 6,960,900 B2 | * 11/2005 | Fogarty et al. | 322/29 |

FOREIGN PATENT DOCUMENTS

DE    2 334 687    1/1974

OTHER PUBLICATIONS

International Search Report, International Application No. PCT/EP 03/050713, European Patent Office, Feb. 6, 2004.

* cited by examiner

*Primary Examiner*—Darren Schuberg
*Assistant Examiner*—Pedro J. Cuevas
(74) *Attorney, Agent, or Firm*—Darby & Darby

(57) ABSTRACT

A method for acceleration of a shaft run that a turbine, in particular a gas turbine, a generator and an excitation machine connected to one another by a common shaft, includes accelerating the turbine is accelerated using acceleration apparatus during a starting process, wherein the excitation machine is used as the acceleration apparatus. In addition, an apparatus for performing the method.

22 Claims, 3 Drawing Sheets

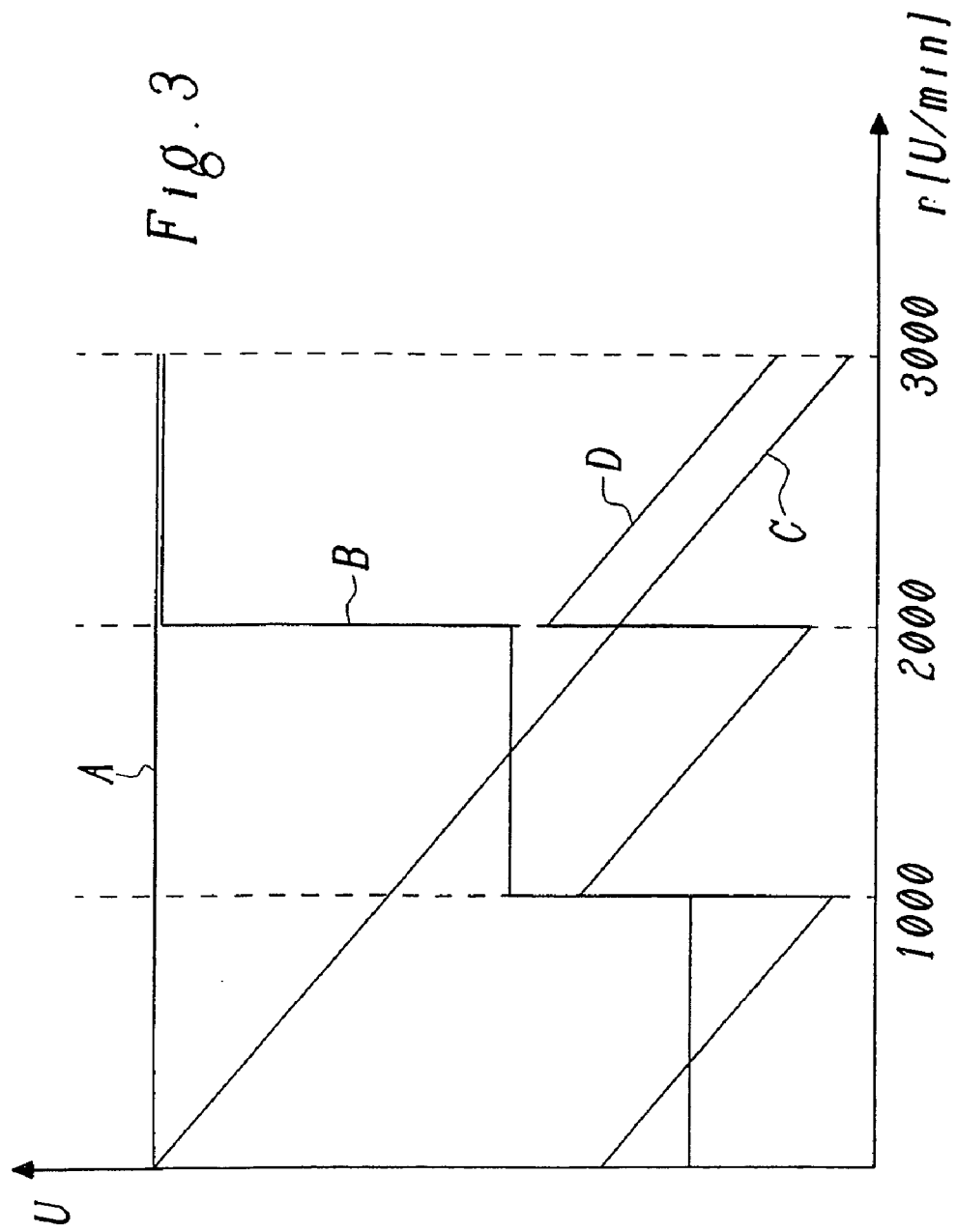

METHOD FOR ACCELERATION OF A SHAFT RUN, AS WELL AS AN APPARATUS FOR CARRYING OUT THE METHOD

This patent application is a continuation for International Patent Application No. PCT/EP2003/050713, filed on Oct. 13, 2003, which claims priority to German Patent Application No. DE 102 47 905.4, filed on Oct. 14, 2002. The entire disclosure of both applications is incorporated by reference herein.

The present invention relates to the field of electrical power generation. It relates in particular to a method for acceleration of a shaft run and to an apparatus for carrying out the method.

BACKGROUND

A method such as this and an apparatus such as this are known, for example, from the document U.S. Pat. No. 5,097,195, which is incorporated by reference herein.

Gas turbines are being used to an ever increasing extent for the generation of electrical power. In this case, the oil or gas which is burnt in the gas turbine is converted to movement energy and then, via a generator, to electrical energy. The gas turbine and the generator are in this case coupled to one another and form a shaft run. The gas turbine cannot be started until it reaches a specific rotation speed. Below this rotation speed, the shaft run must be accelerated by some other component. This component then still has to assist the gas turbine over a wide rotation speed range.

Nowadays, the generator is itself used for this starting process. In this case, the generator is used as a motor rather than as a generator. However, owing to the high regulation quality required for the starting process and owing to the load on the mains and the generator, the generator must not be connected directly to the mains. It is therefore now normal for the generator to be fed via a static frequency converter (SFC) during this process. In this case, the size of the SFC is governed in particular by the required torque at medium to high rotation speeds. In addition to this starting and acceleration apparatus, a second device is required in order to control the excitation of the generator. The generator field winding is fed either via sliprings or via a brushless exciter. In the case of brushless excitation, a second apparatus may be required for frequency conversion (in this context, see the document U.S. Pat. No. 5,097,195, which was cited above).

In some cases, however, the gas turbine is also started by means of an independent drive acting on the shaft. This can be achieved in various ways. In this case, by way of example, asynchronous motors are used with appropriate frequency converters.

The known solutions for this starting process have the disadvantage of the comparatively high degree of complexity. During acceleration via the generator, the frequency converter has to be matched to the voltage level of the main stator circuit, and switching means must be provided for disconnection in the generator mode. In the case of an independent drive, the mechanics of the shaft run are more complex.

SUMMARY OF THE INVENTION

An object of the invention is to provide a method and an apparatus for acceleration of a shaft run, which avoid the disadvantages of the prior art.

The present invention provides a method for acceleration of a shaft run, which shaft run comprises a turbine, in particular a gas turbine, a generator and an excitation machine, which are connected to one another by a common shaft, in which method the turbine is accelerated during the starting process by means of an acceleration apparatus, wherein the excitation machine is used as an acceleration apparatus. The invention involves use of the excitation machine, which is seated on the shaft run, as the acceleration apparatus. In this case, there is no need for the SFC installation which is otherwise normally used and feeds the generator directly during acceleration.

According to one refinement of the invention, the excitation machine has an excitation rotor with a rotor winding, and an excitation stator with a stator winding. During acceleration, the rotor winding is fed with a variable-frequency alternating current, and the stator winding is fed with a constant-frequency alternating current, in particular the mains frequency. A frequency converter connected to the mains is used, in particular, for feeding the rotor winding of the excitation machine. However, conversely, it is also possible to feed the stator winding with a variable-frequency alternating current, and the rotor winding with a constant-frequency alternating current.

Further simplification is obtained if, according to another preferred refinement of the invention, in which the generator has a field winding, the rotor winding of the excitation machine feeds the field winding of the generator after the end of the starting process, and the frequency converter is connected or remains connected to the stator winding of the excitation machine in order to regulate the excitation voltage.

The use of the field winding of the generator by means of the rotor winding of the excitation machine preferably makes use of electronic elements, in particular in the form of a rotating rectifier, with the rotor winding of the excitation machine being permanently connected to the field winding of the generator via the electronic elements, and the electronic elements being switched on or off by a signal, depending on whether the shaft run is being accelerated or whether the generator is being excited.

The present invention also provides an apparatus for carrying out the method that includes a shaft run with a turbine, in particular a gas turbine, a generator and an excitation machine, which are connected to one another by means of a common shaft, and has means for acceleration of the shaft run, wherein the acceleration means comprise a frequency converter which is connected to the mains and can optionally be connected to a rotor winding of the excitation machine. One preferred refinement of the apparatus according to the invention is characterized in that the rotor winding of the excitation machine is connected to a field winding of the generator via controllable electronic elements which can be switched on and off via a control signal line, and in which the electronic elements form a rotating rectifier.

Further embodiments can be found in the claims.

BRIEF DESCRIPTION OF THE DRAWINGS

The invention will be explained in more detail in the following text with reference to exemplary embodiments and in conjunction with the drawings, in which:

FIG. 3 shows examples of curves of the rotor voltage UR (curves A and B) and of the stator voltage $U_{St}$ (curves C and D) during acceleration according to the invention with (curves B and D) and without (curves A and C) a variable-voltage transformer.

DETAILED DESCRIPTION

Figure 1:
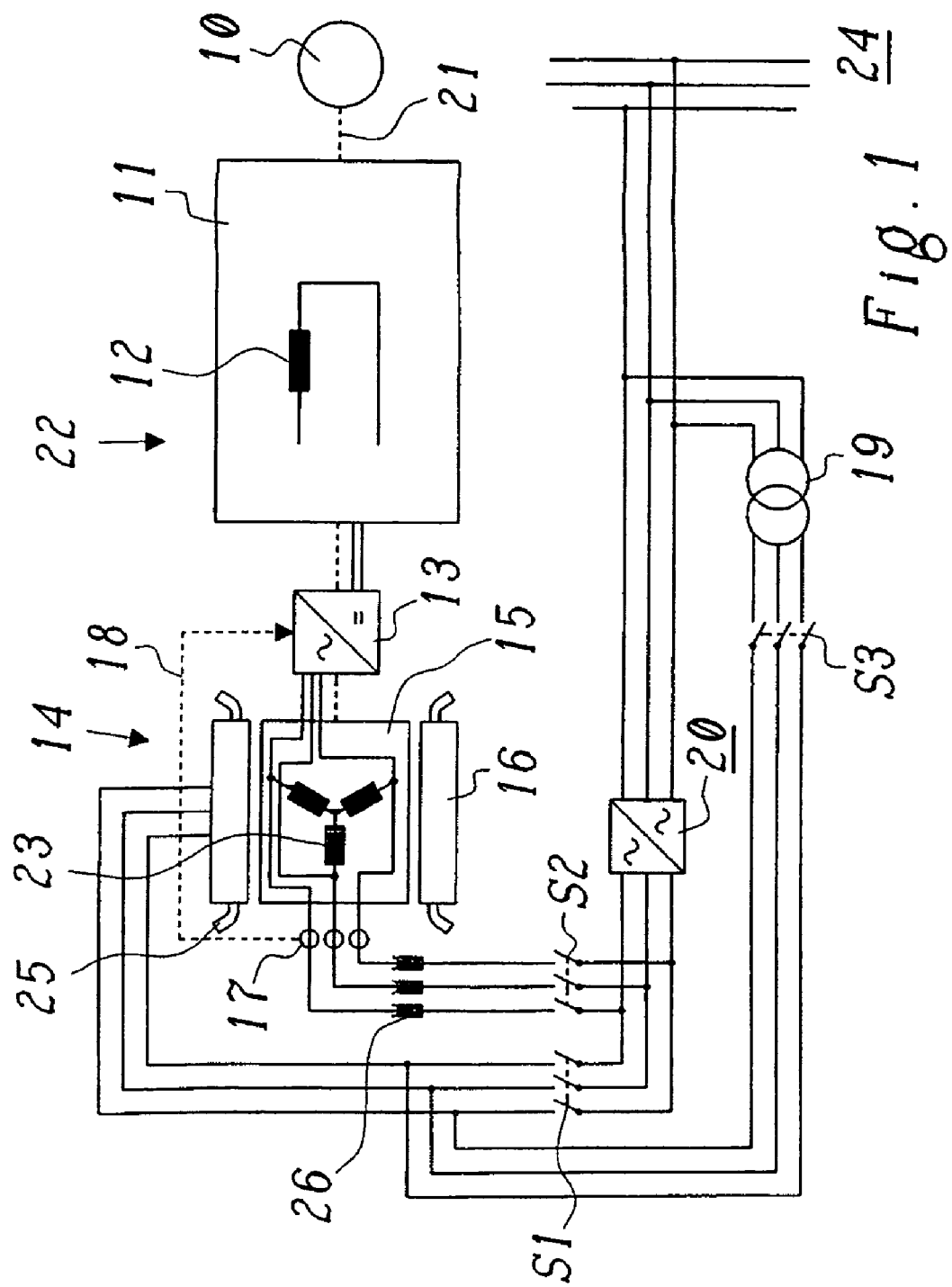
FIG. 1 shows a simplified circuit diagram of a first preferred exemplary embodiment of the invention, in which, during acceleration, the rotor winding is fed with a variable-frequency alternating current and the stator winding is fed with a constant-frequency alternating current.

FIG. 1 shows one preferred exemplary embodiment of the invention, in the form of a simplified circuit diagram. A gas turbine 10, a generator 22, of which only the generator rotor 11 is illustrated, and an excitation machine 14 are connected by means of a common shaft 21 and form a shaft run. The excitation machine 14 has an excitation stator 16 with a stator winding 25, and an excitation rotor 15 with a rotor winding 23. The stator winding 25 can optionally be connected to the mains 24 or to the output of a frequency converter 20, which is connected to the mains 24, via two switches S1 and S3. The rotor winding 23 is connected to a field winding 12 in the generator rotor 11 via electronic elements in the form of a rotating rectifier 13. The rotating rectifier 13 contains electronic elements (for example thyristors), which can be switched on and off via a control signal line 18. When the electronic elements are switched on, the rotor winding 23 is connected to the field winding 12. In contrast, when the electronic elements are switched off, this connection is interrupted. The rotor winding 23 is connected to the output of the frequency converter 20 via a further switch S2. A variable-voltage transformer 19 can be inserted into the feed circuit.

During normal or continuous operation, the switches S2 and S3 are open, while the switch S1 is closed. The stator winding 25 of the excitation machine 14 is fed by the frequency converter 20. The voltage which is induced in the rotor winding 23 is rectified in the rotating rectifier 13, and feeds the field winding 12 of the generator 22. The electrical power that is generated is available on the stator winding (which is not illustrated) of the generator 22. The frequency converter 20 can in this case be used to regulate the excitation voltage.

During the starting process, the switches S2 and S3 are closed, and the switch S1 is open, in order to accelerate the shaft run. The stator winding 25 of the excitation machine 14 is thus fed from the mains 24, and the rotor winding 23 is fed via sliprings 26 from the frequency converter 20. Appropriate control signals are tapped off via current transformers 17 in the supply lines between the variable-voltage transformer 19 and the rotor winding 23, and are passed via a control signal line 18 to the rotating rectifier 13, whose electronic elements are switched off, thus interrupting the connection between the rotor winding 23 and the field winding 12. The excitation machine 14 thus operates as a drive motor for the shaft run. The starting process can in this case be controlled via the frequency converter 20. Once the rotation speed required for operation of the gas turbine 10 has been reached, it is possible to switch over to the continuous mode, as described above. The variable-voltage transformer 19 can be switched on in order to load the frequency converter in a protective manner, with the switching between the various taps preferably being carried out electronically. During this starting process, it may be advantageous for the stator winding 25 of the excitation machine 14 to be fed initially, at low rotation speeds, with a variable-frequency alternating current, in particular from the frequency converter 20 which is connected to the mains 24, and when the excitation resistance is used as a load while the stator winding 25 of the excitation machine 14 is being fed with a variable-frequency alternating current.

Figure 2:
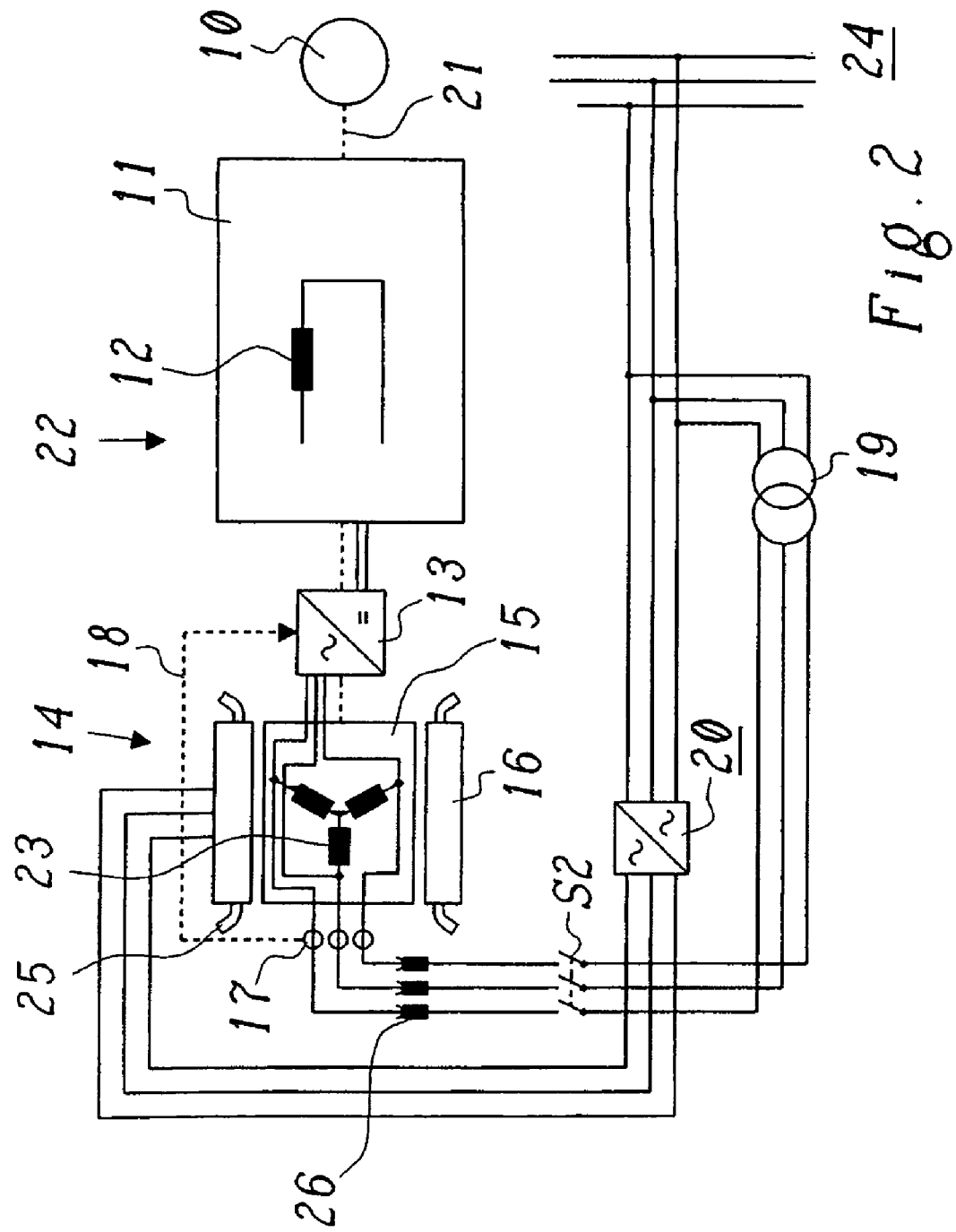
FIG. 2 uses a circuit diagram comparable to that in FIG. 1 to show a second preferred exemplary embodiment of the invention, in which, during acceleration, the stator winding is fed with a variable-frequency alternating current, and the rotor winding is fed with a constant-frequency alternating current.

FIG. 2 shows the opposite feed to that shown in FIG. 1. In this case, the rotor winding 23 is connected to the mains via sliprings 26, the switch S2 and, if required, the variable-voltage transformer 19, and is fed with a constant-frequency alternating current, in particular the mains frequency. The stator winding 25, in contrast, is fed with a variable-frequency alternating current from the frequency converter 20.

FIG. 3 shows the voltage profiles U(r) for various situations as a function of the rotation speed r during acceleration. The curve A shows the rotor voltage UR without the use of the variable-voltage transformer 19, the curve B shows the rotor voltage UR with the variable-voltage transformer 19 being used, the curve C shows the stator voltage $U_{St}$ without the use of the variable-voltage transformer 19, and the curve D shows the stator voltage $U_{St}$ with the variable-voltage transformer 19 being used.

Overall, the solution according to the invention results in the following characteristic properties, features and advantages:

- the variable rotation speed form of the excitation machine of a brushless generator allows the excitation machine to be used as an acceleration apparatus. There is no need for the SFC installation, which is otherwise normally required and feeds the generator directly.
- An accelerator excitor such as this allows starting of generator turbines in which the generator has a high-voltage winding (for example in the case of the so-called "Powerformer"; in this context, see M. Leijon—Powerformer—a radically new rotating machine, ABB Review 2 (1998) pp. 21–26) without the variable-frequency feed being transformed up via an intermediate transformer to the voltage level of the generator, and without any complex additional winding being required.
- The use of a variable rotation speed generator is assisted by an acceleration excitor since, in consequence, the generator and the converter can be designed solely for the generator mode, but not for the motor mode.
- The stator winding of the generator is no longer subjected to the high-frequency voltage peaks of the starting apparatus during starting. This reduces the risk of damage to the generator insulation. Shaft voltages caused by voltage peaks are likewise reduced.
- The solution is also suitable for deceleration of the shaft run.
- The brushes are suitable for excitor boosting, that is to say for briefly increasing the excitation current, during operation.
- The brushes can be raised during operation.
- The method and the installation can be used for the turning mode, in which the shaft run is rotated slightly.

The invention claimed is:

1. A method for acceleration of a shaft run, the method comprising:
   providing a shaft run that includes a turbine, a generator and an excitation machine connected to one another by a common shaft;

electrically connecting a frequency converter to the excitation machine with a plurality of slip rings connected between the frequency converter and the excitation machine; and starting the turbine by accelerating the shaft using the excitation machine.

2. The method as recited in claim 1, wherein the turbine is a gas turbine.

3. The method as recited in claim 1, wherein the excitation machine includes an excitation rotor with a rotor winding and includes an excitation stator with a stator winding, and further comprising feeding the rotor winding with a variable-frequency alternating current and feeding the stator winding with a constant-frequency alternating current during the accelerating.

4. The method as recited in claim 3, wherein the constant frequency alternating current is the mains frequency.

5. The method as recited in claim 1, wherein the excitation machine includes an excitation rotor with a rotor winding and includes an excitation stator with a stator winding, and further comprising feeding the stator winding with a variable-frequency alternating current and feeding the rotor winding with a constant-frequency alternating current during the accelerating.

6. The method as recited in claim 5, wherein the constant frequency alternating current is the mains frequency.

7. The method as recited in claim 3, wherein the feeding of at least one of the rotor winding and the stator winding is performed using the frequency converter connected to the mains.

8. The method as recited in claim 5, wherein the feeding of at least one of the rotor winding and the stator winding is performed using the frequency converter connected to the mains.

9. The method as recited in claim 7, wherein the generator includes a field winding and wherein, after completion of the starting process, the rotor winding feeds the field winding and the frequency converter is connected to the stator winding so as to regulate an excitation voltage.

10. The method as recited in claim 9, wherein the feeding of the field winding from the rotor winding is performed using electronic elements.

11. The method as recited in claim 10, wherein the electronic elements form a rotating rectifier.

12. The method as recited in claim 10, wherein the rotor winding is permanently connected via the electronic elements to the field winding, and further comprising switching on or off the electronic elements using a signal depending on whether the shaft run is being accelerated or whether the generator is being excited.

13. The method as recited in claim 3, further comprising feeding the stator winding of the excitation machine during the accelerating using a variable-frequency alternating current.

14. The method as recited in claim 13, wherein the feeding of the stator winding is performed using a frequency converter connected to the mains.

15. The method as recited in claim 14, wherein the generator includes a field winding and wherein a resistance of the field winding is used as a load during the feeding of the stator.

16. An apparatus comprising:
    a shaft run including a turbine, a generator, an excitation machine, and a common shaft connecting the turbine, the generator, and the excitation machine;
    a frequency converter connected to a mains and to the excitation machine and configured to start the turbine by accelerating the shaft; and
    a plurality of slip rings disposed between the frequency converter and the excitation machine.

17. The apparatus as recited in claim 16, wherein the turbine is a gas turbine.

18. The apparatus as recited in claim 17, wherein the excitation machine includes a rotor winding and wherein the frequency converter is connected to the rotor winding.

19. The apparatus as recited in claim 16, wherein the excitation machine includes a rotor winding and the generator includes a field winding and further comprising a control signal line and controllable electronic elements connecting the rotor winding to the field winding, the controllable electronic elements configured to be switched on and off using the control signal line.

20. The apparatus as recited in claim 19, wherein the electronic elements form a rotating rectifier.

21. The apparatus as recited in claim 18, further comprising a variable-voltage transformer disposed between the frequency converter and the rotor winding.

22. The apparatus as recited in claim 16, wherein the excitation machine has a stator winding configured to be connected to at least one of the frequency converter and the mains.

* * * * *